Oct. 4, 1932.  W. A. DOBSON  1,880,891
TYPEWRITING MACHINE
Filed Oct. 22, 1931
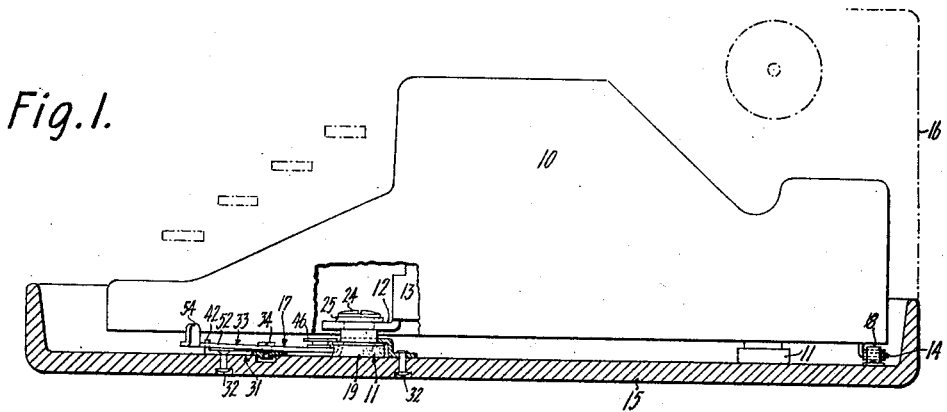
Fig. 1.
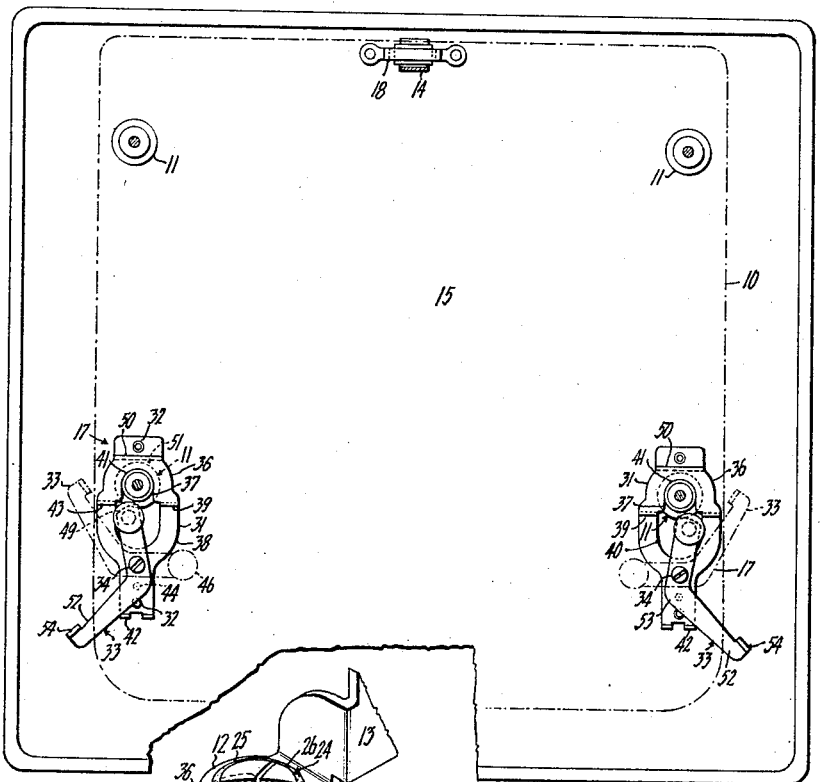
Fig. 2.
Fig. 3.
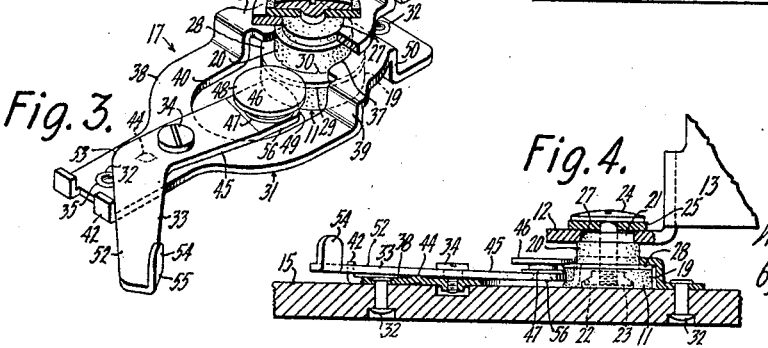
Fig. 4.
Inventor:
William A. Dobson
by B. C. Stickney
Attorney Patented Oct. 4, 1932

1,880,891

UNITED STATES PATENT OFFICE

WILLIAM A. DOBSON, OF BRIDGEPORT, CONNECTICUT, ASSIGNOR TO UNDERWOOD ELLIOTT FISHER COMPANY, OF NEW YORK, N. Y., A CORPORATION OF DELAWARE

TYPEWRITING MACHINE

Application filed October 22, 1931. Serial No. 570,300.

The invention relates to means for releasably clamping a portable typewriter within a carrying-case.

The improved clamp prevents any movement or vibration of the machine on its support, especially in vertical direction. It can be attached or detached in a simple and rapid manner, and is inexpensive.

An object is to improve the foot to be secured in said clamp.

Typewriting machines are usually provided with sound-deadening or cushion rubber feet presenting a rim at the lower end. These are usually bolted to bottom flanges of the machine-frame, the nuts being countersunk into the rubber. The invention provides means for equalizing or distributing the vertical clamping pressure over the entire periphery of this rim, and for reinforcing said feet, without reducing their sound-deadening and cushioning qualities.

Other features and advantages will hereinafter appear.

In the accompanying drawing,

Figure 1 is a side elevation, partly in section, showing a baseboard of a portable carry-case together with a portable machine secured thereto.

Figure 2 is a plan showing the baseboard of a carrying-case with the clamps in holding positions.

Figure 3 is an enlarged perspective showing a clamp in effective position.

Figure 4 is an enlarged sectional side elevation of the clamp shown in Figure 1.

Said drawing shows how an Underwood portable typewriter 10, having four rubber feet 11, carried by bottom flanges 12 of the frame 13 of said typewriter, and a rear hook 14 may be tightly attached to the baseboard 15 of a carrying-case 16 by means of two clamps 17 co-operating with the two front feet 11 and an eye 18 fastened at the back of said baseboard and co-operating with said hook 14.

Each of these front feet 11 consists of a rubber base or rim 19 in one piece with a shank 20, in which is formed a peripheral top groove 21. The rim 19 is countersunk at 22 to receive a hexagonal flat-headed nut 23 of a flat-headed bolt 24, serving to make the foot fast to one of the bottom flanges 12 of the frame 13. For noise-deadening purpose, a rubber washer 25 is interposed between said flange 12 and the flat head 26 of the bolt 24. This flat head 26 is of substantially the same diameter as said washer 25.

The grooved top 21 of the shank 20 fits into a hole 27 of the flange 12. A thin reinforcing steel washer 28 is mounted on the shank 20 and bears against the annular top surface or shoulder 29 of the rim 19. Small pressed-down indentations 30 are formed in the inner periphery of said washer and are thrust into the rubber surface 29 to prevent the angular displacement of the washer 28 with respect to the rim 19.

Each clamp 17 comprises an oblong anchor-plate or foot-socket 31, made fast to the baseboard 15 at both ends by means of split rivets 32, and a locking-lever 33 pivotally mounted on said plate by means of a collar-screw 34. A counter-sink 35 is provided for the front split rivet 32 in order to clear the path of the lever 33.

Said socket or anchor-plate is provided with a transversely-raised flat portion 36 and with a longitudinal keyhole-shaped slot 37 extending partly into said raised part 36 and into a front bottom part 38 lying flat upon the surface of the baseboard 15, and through a vertical front shoulder or upturned offset 39 joining said two parts 36 and 38.

The large U-shaped front opening or entrance 40 of said keyhole-shaped slot 37 is provided in the bottom part 38 and in the front shoulder 39. The width of said entrance 40 of the slot 37 is slightly larger than the diameter of the foot-rim 19 and of the steel washer 28. The narrow rear end 41 of the slot 37 has the profile of a bell, and is located in the raised portion 36. Its width is slightly larger than the diameter of the foot-shank 20. The height of the rim 19, when covered with the steel washer 28, is such that said rim fits tightly under said raised portion 36 when the foot-shank 20 is engaged into the small end 41 of the slot 37. An upturned lug 42, formed at the front end of the bottom part 38 of the socket, serves as a stop to limit the rotation of the lever 33 in one direction, while the outer vertical edge 43 of the front shoulder 39 stops this rotation in the opposite direction.

A small upwardly-projecting bulge 44 is formed by pressing up a part of the bottom part 38 between the lug 42 and the pivot-screw 34 and acts as a wedge under the lever 33 to hold said latter down and fast in its locking position.

Near the end of the short arm 45 of the lever 33 is formed a slightly bent-up portion 56, on which is riveted a flat-headed stud 46 integral with a bearing-collar 47. The flat head 48 of said stud is located in the plate of the raised flat portion 36 and is of substantially the same thickness as the socket 31, so that it will co-operate with the U-shaped edge of the narrow part of the slot 37 to hold the typewriting machine 10 down quite tightly on the baseboard 15.

The end of this short arm 45 is cam-shaped at 49 and co-operates with the rubber rim 19 of the foot 11, so as to wedge said foot in the socket by compressing said rubber rim against the rear vertical shoulder 50 of the socket 31. The segmental rear small portion of the steel washer 28 which then protrudes beyond the compressed rear part of the rim 19 engages in a small clearance 51 formed by a rearwardly-bent portion of said rear shoulder 50, while the opposite segmental protruding portion of said washer 28 is engaged in the free annular space between the flat head 48 and the bearing-collar 47 of the stud 46.

The long arm 52 of the lever 33 is outwardly bent or crooked at 53 in order to project far enough on the side of the frame 13 to give an easy access to a finger-piece 54 formed by bending upwardly a lateral projection 55 of the end of said long arm 52.

When it is desired to place the typewriting machine 10 in its carrying-case 16, the machine is first laid down upon the baseboard 15 with the rims 19 of the two front feet 11 engaging the entrance or large portion of the slots 37 of the two clamps 17, thereby centering the hook 14 of the machine in front of the eye 18 of the baseboard 15. Then the machine is pushed horizontally to the rear until the shanks 20 of its front feet 11 engage the narrow rear part of said slots 37, while simultaneously the hook 14 penetrates into the eye 18. The annular shoulders 29 are then pressed down on the baseboard 15 as the rims 19 are vertically squeezed between the edges of said narrow ends of the slots 37 and the surface of said baseboard.

The levers 33 are then swung in locking position to close the entrance of the slots 37 and held in this locking position by the wedging action of the bulges 44.

The rear part of the flat heads 48 projecting horizontally beyond the cams 49 co-operate then with the U-shaped edges of the narrow parts of the slots 37 in order to complete their holding-down action on the open front of said narrow part, while the cams act as wedges and compress the rims 19 against the rear vertical shoulders 50.

In this manner the two front feet 11 are rigidly held in the sockets 31, any vertical displacement or vibration being prevented by the U-shaped edges of the narrow parts of the slots 37 and by the flat head 48, while lateral displacement or vibration in any direction is prevented by the wedging and rubber-compressing action of the cams 49.

As, on one hand, these front feet 11 are steadfastly fastened to the flanges 12 under the frame 13, and, on the other hand, the hook 14 fits tightly into the eye 18, the machine 10 will be therefore rigidly held on the baseboard as long as the levers 33 are kept in their locking position.

To remove the machine from its carrying-case, these three operations, i. e., laying down the machine, shifting it to the rear, and closing the locking-levers, are merely reversed, namely, one opens the locking-levers, shifts the machine to the front and lifts it out of its case.

It will be noticed that each of the two front feet, in order to be removably clamped on the baseboard, is provided with a thin sheet-metal washer fastened upon the annular top surface of said rim, and a sound-deadening washer is interposed between the bolt-head and the bottom flange that carries the foot, in order to enhance the sound-deadening effect of said foot.

Each clamp comprises an oblong foot-socket or anchor-plate that is fastened to said baseboard at both ends, and a bent locking-lever pivotally mounted on said socket.

This socket or anchor-plate is provided with a transversely-raised portion, and with a longitudinal keyhole-shaped slot that extends partly into said raised part, and partly into the front bottom part lying flat upon the surface of the baseboard, and through the vertical shoulder or upturned offset joining said two parts.

The large U-shaped front opening or entrance of said slot is in said front bottom part and in said front shoulder, and its width is slightly larger than the diameter of the shank of the foot. The height of the rim when covered with the steel washer is such that the rim fits tightly under said raised portion of the socket when the foot-shank is engaged in said narrow end of the slot. An upturned lug, formed at the front end of said socket, serves as a stop to limit the angular movement of the locking-lever in one direction, while the outer vertical edge of the front shoulder stops this movement in the opposite direction.

A small upwardly-projecting bulge is formed in the front bottom part of the socket between said lug and the pivot of the locking-lever, and acts as a wedge under the lever to hold said latter in its operative position.

Near the end of the short arm of this lever is formed a slightly bent-up portion, on which is fastened a flat-headed stud, the flat head of which is located in the plane of the raised portion of the socket and co-operates with the edge of the narrow part of the slot to hold the machine quite tightly down by pressing on the steel washer. The end of this short arm is cam-shaped and co-operates with the rubber rim of the foot, so as to wedge the foot in the socket by compressing said rubber rim against the rear shoulder of the socket. The then protruding rear part of the steel washer engages in a small clearance of said rear shoulder, while the front protruding part thereof is engaged in the free annular space between the flat head of the stud and the lever.

The end of the long arm of the locking-lever projects at right angle and is upturned, so as to form a lateral finger-piece, while said long arm is bent outwardly, so as to project far enough on the side of the typewriting-machine frame to give an easy access to said finger-piece.

Variations may be resorted to within the scope of the invention, and portions of the improvements may be used without others.

Having thus described my invention, I claim:

1. A clamp comprising an oblong socket or anchor plate formed by a transversely-raised flat portion, two bottom flat end portions, two offsets or shoulders joining these three portions together and an upturned lug at one end, a longitudinal keyhole-shaped slot having its narrow part cut in said raised portion and its large part cut through one of these shoulders and in one of said bottom end portions, a locking-lever acting as the movable jaw of the clamp in co-operation with the other shoulder acting as the fixed jaw of the clamp, and means on said socket acting as a wedge under said lever to hold it fast in its locking position, the angular displacement of said lever being limited on one side by said lug and on the opposite side by one of the lateral edges of the slotted shoulder.

2. A clamp to secure removably a peripherally-grooved foot to a flat support, comprising an oblong socket or anchor plate having a transversely-raised portion and a longitudinal keyhole-shaped slot, the narrow part of which is provided in said raised portion and is adapted to press on the bottom of said groove when said foot is engaged down in the large part or entrance of said slot and is shifted laterally in said narrow part of the slot, and a locking-lever pivoted on said socket and having a cam-shaped operating end acting as the movable jaw of the clamp and a flat-headed stud fixed near said end and co-operating with the edge of said narrow part of the slot to hold tightly down the inserted foot by pressing on the bottom of its groove.

3. An attaching device for a typewriter machine comprising, in combination, a clamp having a foot-socket fastened to the support to which the machine is to be attached and a locking-lever pivoted on said socket and constituting the movable jaw of the clamp, and a rubber foot bolted to a flange of the frame of the machine having a sound-deadening washer interposed under the head of the bolt, a bottom rubber rim adapted to fit tightly under said socket and a washer secured on said rim.

4. A clamp for a typewriting machine comprising, in combination, a locking-lever and an oblong socket or anchor-plate having two flat bottom ends fastened by means of two split rivets to a support for said machine, a countersink for one of said rivets, two transversal shoulders, a flat raised portion joining the tops of said shoulders, a U-shaped small opening in said raised portion, a U-shaped large opening in the front bottom end and the front shoulder, an upturned lug at its front end, a pressed-up bulge in the longitudinal axis of said front bottom end, and a pressed-down threaded hole for the pivot of said locking-lever located in said longitudinal axis between said bulge and said countersink.

5. A clamp for a typewriting machine comprising, in combination, a socket or anchor-plate and a crooked or bent locking-lever pivoted on said socket by means of a collar-screw and having a rear short arm slightly bent up near its end, a cam-shaped edge formed at the end of this short arm, a flat-headed stud with a relatively large bearing collar riveted near this end so that a part of this flat head projects horizontally beyond said cam-shaped edge and a rear long arm carrying near its end a finger-piece formed by upturning a lateral projection of said end.

6. A clamp for a typewriting machine comprising the combination of a crooked or bent locking-lever having a rear short arm slightly bent up near its end, a cam-shaped edge formed at the end of this short arm, a flat-headed stud with a relatively large bearing collar riveted near this end so that a part of this flat head projects horizontally beyond said cam-shaped edge, and a rear long arm carrying near its end a finger-piece formed by upturning a lateral projection of said end with an oblong socket or anchor-plate having two flat bottom ends fastened by means of two split rivets to a support for said machine, a countersink for one of said rivets, two transversal shoulders, a flat raised portion joining the tops of said shoulders, a U-shaped small opening in said raised portion, a U-shaped large opening in the front bottom end and the front shoulder, an upturned lug at its front end, a pressed-up bulge in the longitudinal axis of said front bottom end, and a pressed-down threaded hole for the pivot of said locking-lever located in said longitudinal axis between said bulge and said countersink.

WILLIAM A. DOBSON.